(12) United States Patent
Aoki et al.

(10) Patent No.: US 10,208,852 B2
(45) Date of Patent: Feb. 19, 2019

(54) STEERING LEVER SYSTEM FOR WORK VEHICLE

(71) Applicant: KUBOTA CORPORATION, Osaka (JP)

(72) Inventors: Hideki Aoki, Duluth, GA (US); David Spitz, Atlanta, GA (US); Masahiro Yamada, Duluth, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 15/479,684

(22) Filed: Apr. 5, 2017

(65) Prior Publication Data

US 2018/0292001 A1 Oct. 11, 2018

(51) Int. Cl.
*F16H 59/06* (2006.01)
*B62D 1/12* (2006.01)
*B62D 11/02* (2006.01)
*F16H 59/04* (2006.01)
*B62D 11/12* (2006.01)
*A01B 69/00* (2006.01)
*A01D 34/66* (2006.01)
*F16H 59/02* (2006.01)
*A01D 101/00* (2006.01)

(52) U.S. Cl.
CPC ............ *F16H 59/06* (2013.01); *A01B 69/007* (2013.01); *A01D 34/664* (2013.01); *B62D 1/12* (2013.01); *B62D 11/02* (2013.01); *B62D 11/12* (2013.01); *F16H 59/044* (2013.01); *A01D 2101/00* (2013.01); *F16H 2059/0256* (2013.01)

(58) Field of Classification Search
CPC .................. B62D 1/12; B60T 2260/02; A01D 2034/6843; F16K 31/047; F16K 31/56
USPC ......................................................... 180/6.32
See application file for complete search history.

(56) References Cited

U.S. PATENT DOCUMENTS

| 4,217,789 | A | * | 8/1980 | Larson | B60K 26/00 74/470 |
| 4,363,249 | A | * | 12/1982 | Stugart | B60K 28/00 180/272 |
| 4,485,689 | A | * | 12/1984 | Cambria | B60K 20/00 74/473.21 |
| 6,530,200 | B1 | * | 3/2003 | Minoura | A01D 34/64 56/15.2 |
| 6,739,116 | B2 | * | 5/2004 | Stover | A01D 69/10 56/11.3 |

(Continued)

*Primary Examiner* — Victor L MacArthur
(74) *Attorney, Agent, or Firm* — Greenblum & Bernstein, P.L.C.

(57) ABSTRACT

A steering lever system includes a pair of lever bodies, a pivotal body coupled to each of the lever bodies and a neutral position detector. The pivotal body includes a first boss portion and a second boss portion. The lever body is pivotable about a first pivot axis of the first boss portion from a neutral position to a neutral end position. The lever body is also pivotable about a second pivot axis of the second boss portion from a forward traveling end position through a neutral position to a reverse traveling end position. The neutral position detector is responsive to a detected portion provided in an auxiliary member fixed to the lever body, at the neutral end position of the lever body. The detected portion is offset from a pivotal locus of the lever body about the first pivot axis.

4 Claims, 7 Drawing Sheets

(56) References Cited

U.S. PATENT DOCUMENTS

| | | | | |
|---|---|---|---|---|
| 7,458,432 B2* | 12/2008 | Mayer | .................... | A01D 34/68 |
| | | | | 180/6.32 |
| 8,352,116 B2* | 1/2013 | Boylston | .................. | G01C 9/00 |
| | | | | 56/10.2 R |
| 8,838,311 B2* | 9/2014 | Koike | .................. | B62D 11/003 |
| | | | | 701/22 |
| 9,180,776 B2* | 11/2015 | Spitz | ....................... | B60K 15/06 |
| 9,285,028 B2* | 3/2016 | Reichard | ................. | F16H 59/02 |
| 9,313,953 B2* | 4/2016 | Borshov | ................. | B60T 1/005 |
| 9,538,706 B2* | 1/2017 | Haun | .................. | A01D 75/28 |
| 9,650,024 B2* | 5/2017 | Weihl | ........................ | B60T 7/12 |
| 9,656,687 B2* | 5/2017 | Koike | ..................... | B62D 6/04 |
| 2007/0068711 A1* | 3/2007 | Adkins | ................. | A01D 69/03 |
| | | | | 180/6.48 |
| 2009/0205226 A1* | 8/2009 | Olmr | ........................ | E01H 5/04 |
| | | | | 475/230 |
| 2010/0038155 A1* | 2/2010 | Mass | .................... | A01B 33/028 |
| | | | | 180/19.3 |
| 2010/0191408 A1* | 7/2010 | Boylston | ................ | A01D 75/28 |
| | | | | 701/31.4 |
| 2011/0178684 A1* | 7/2011 | Umemoto | ............. | F16H 61/421 |
| | | | | 701/51 |
| 2012/0307863 A1* | 12/2012 | Tada | ...................... | G01K 13/02 |
| | | | | 374/144 |
| 2012/0323420 A1* | 12/2012 | Koike | .................. | B62D 11/003 |
| | | | | 701/22 |
| 2015/0039171 A1* | 2/2015 | Koike | .................. | B62D 11/003 |
| | | | | 701/22 |
| 2016/0069309 A1* | 3/2016 | Takaoka | ............. | F02M 37/0088 |
| | | | | 123/468 |
| 2016/0251003 A1* | 9/2016 | Weihl | ........................ | B60T 7/12 |
| | | | | 701/70 |
| 2017/0196164 A1* | 7/2017 | Bryant | ................. | A01D 34/008 |
| 2017/0217488 A1* | 8/2017 | Koike | .................. | B62D 11/003 |

* cited by examiner

STEERING LEVER SYSTEM FOR WORK VEHICLE

TECHNICAL FIELD

The present invention relates to a steering lever system configured to control forward and reverse traveling of a work vehicle.

BACKGROUND ART

Such steering lever system as above finds one exemplary application thereof in a zero turning radius mower (to be referred to as "ZTRM" hereinafter). A ZTRM known from U.S. Pat. No. 9,285,028 includes a variable traveling power supplying unit for supplying forward traveling power and reverse traveling power to traveling drive wheels, a lever steering mechanism for generating a forward/reverse traveling operational displacement of a linear-shaped lever body including a neutral position along a first direction of the lever body and a neutral operational displacement of the lever body from the neutral position along a straight second direction intersecting the first direction, and a link mechanism for transmitting the forward/reverse traveling operational displacement of the lever body of the lever steering mechanism to the variable traveling power supplying unit. At one displacement end of the forward/reverse traveling operational displacement of the lever body, a forward maximum speed is obtained. At the other displacement end of the forward/reverse traveling operational displacement of the lever body, a reverse maximum speed is obtained. At one displacement end of the neutral operational displacement of the lever body, there is provided a working neutral state wherein the lever body is allowed to switch from this the neutral operational displacement to the forward/reverse traveling operational displacement. At the other displacement end of the neutral operational displacement of the lever body, there is provided a resting neutral state wherein the lever body is held under a neutral state. Under this resting neutral state, the lever body cannot effect the forward/reverse traveling operational displacement, and power supply to the traveling drive wheels is stopped.

U.S. Pat. No. 7,458,432 discloses a lever steering mechanism for a ZTRM. This lever steering mechanism includes a housing, a forward/reverse traveling lever, and a neutral position lever pivotally attached to the forward/reverse traveling lever. The housing has an opening in which the forward/reverse traveling lever is inserted to be pivotable about a first axis and a slot configured to allow a pivotal movement of the neutral position lever about a second axis perpendicular to the first axis. The pivotal displacement of the neutral position lever is a linear displacement that extends at a right angle from the neutral position in the linear pivotal displacement of the forward/reverse traveling lever. At a terminal end of this displacement, the neutral position lever comes into abutment against a safety switch which is disposed outside the hosing. Namely, the safety switch is located on a pivotal locus of the neutral position lever. At the terminal end of the displacement, the neutral position lever is bound within the slot, so that a pivotal movement of the forward/reverse lever about the first axis is inhibited and neutral state of a hydraulic pump is maintained.

For stopping power supply to the traveling drive wheels, the neutral position lever is moved to the neutral position in the forward/reverse traveling operational displacement. In order to prevent inadvertent displacement of the neutral position lever to a forward traveling positon or a reverse traveling position, in particular in the case of e.g. vehicle parking, it is desired that the neutral position lever will be moved from the neutral positon to a neutral end position in the neutral operational displacement. For confirming that the neutral positon lever is located at the neutral end position, a detection signal from a neutral position detector as the safety switch is utilized. To this end, an operational portion of the neutral position detector should be disposed in the pivotal locus of the neutral position lever. However, in the periphery of the pivot axis of the lever steering mechanism, the space is limited as various components and cables are disposed there. For this reason, in order to create space available for the neutral position detector, some special arrangement will be required such as relocation of some of the components, circumvention of the wires, etc. And, such special arrangement will invite increased complexity of the arrangement, deterioration of the aesthetic appearance, etc.

In view of the above-described state of the art, there is a need for a steering lever system that facilitates disposing of the neutral position detector.

SUMMARY OF INVENTION

A steering lever system for controlling forward traveling and reverse traveling of a work vehicle comprises:

a pair of lever bodies;

a pivotal body coupled to each of the lever bodies, the pivotal body including a second boss portion and a first boss portion, wherein the lever body is pivotable about a first pivot axis of the first boss portion from a neutral position to a neutral end position, and the lever body is also pivotable about a second pivot axis of the second boss portion from a forward traveling end position through a neutral position to a reverse traveling end position, the second pivot axis extending in a direction transverse to the first pivot axis;

an auxiliary member fixed to the lever body, the auxiliary member forming a detected portion configured to create a pivotal locus that is laterally offset from a pivotal locus of the lever body about the first pivot axis; and a neutral position detector responsive to the detected portion at the neutral end position of the lever body.

With the above-described arrangement, arrival of the lever body at the neutral end positon is detected by the neutral position detector which is responsive to the detected portion formed in the auxiliary member fixed to the lever body. In association with a pivotal movement of the lever body about the first pivot axis which brings this lever body to the neutral end position, the auxiliary member is pivoted also. In this, however, the pivotal locus of the detected portion is offset laterally from the pivotal locus of the lever body. Thus, the neutral position detector need not be disposed on the pivotal locus of the lever body, but can be disposed on the pivotal locus of the detected portion instead. Consequently, even if the neutral position detector is disposed at an appropriate position free from interference with the other components or cables, by attaching the auxiliary member to the lever body in such a manner that the neutral position detector is located on the pivotal locus of the detected portion, the neutral end position of the lever body can be detected effectively by the neutral position detector.

DETAILED DESCRIPTION

Figure 1:
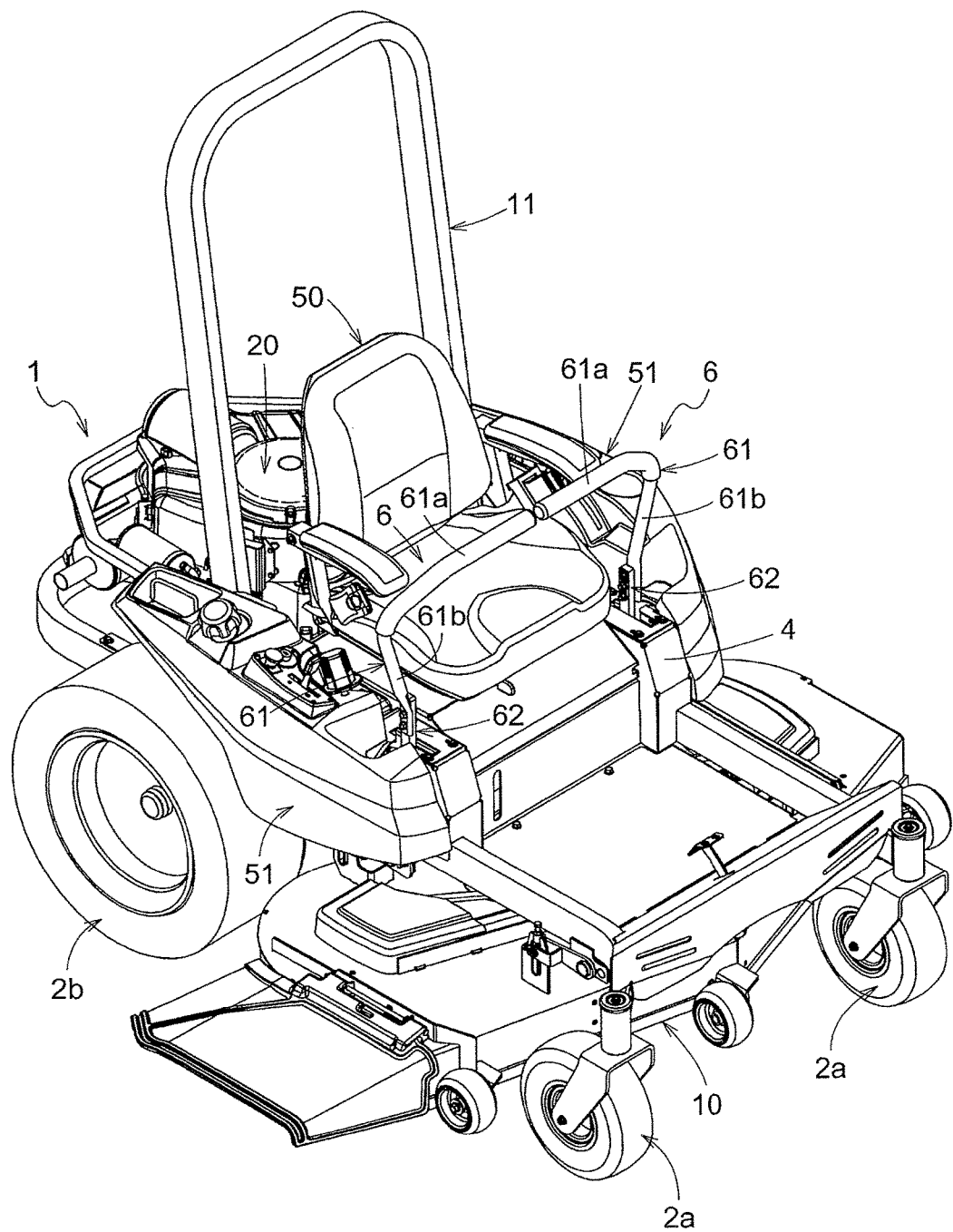
FIG. 1 is an overall outer appearance view of a zero turning radius mower (ZTRM) to which a steering lever system according to one embodiment is applied.

Next, one embodiment of the present invention will be explained with reference to the drawings. Here, a steering lever system for a work vehicle is mounted on a riding type grass mowing machine as shown in FIG. 1. This riding grass mowing machine includes a vehicle body 1 supported by a pair of left and right front wheels 2a and a pair of left and right rear wheels 2b. The left and right rear wheels 2b respectively can be speed-controlled independently of each other, thus, this machine being called "a zero turning radius mower" also.

The vehicle body 1 is a framework consisting of angular pipes, etc. Between the pair of left and right front wheels 2a and the pair of left and right rear wheels 2b and via an unillustrated link mechanism, a mower unit 10 is liftably suspended from the vehicle body 1. The link mechanism has a function of parallel lifting up/down the mower unit 10 by a pedal operation or a lever operation.

At the center of the vehicle body 1, a driver's seat 50 is mounted. On the left and right sides of the driver's seat 50, there are respectively disposed a fender 51 and a steering lever assembly 6 constituting the steering lever system. On the top face of the fender 51, there are disposed various operational levers, operational buttons, etc. Rearwardly of the driver's seat 50, there is mounted an arch-like ROPS (roll-over protection system) 11. The ROPS 11 is formed of an angular pipe. An area rearwardly of the ROPS 11 is an area where a power unit including an engine 20 is to be disposed. The engine 20 is mounted on the vehicle body 1 under such a posture that its output shaft 20a (see FIG. 2) projects downwards.

Figure 2:
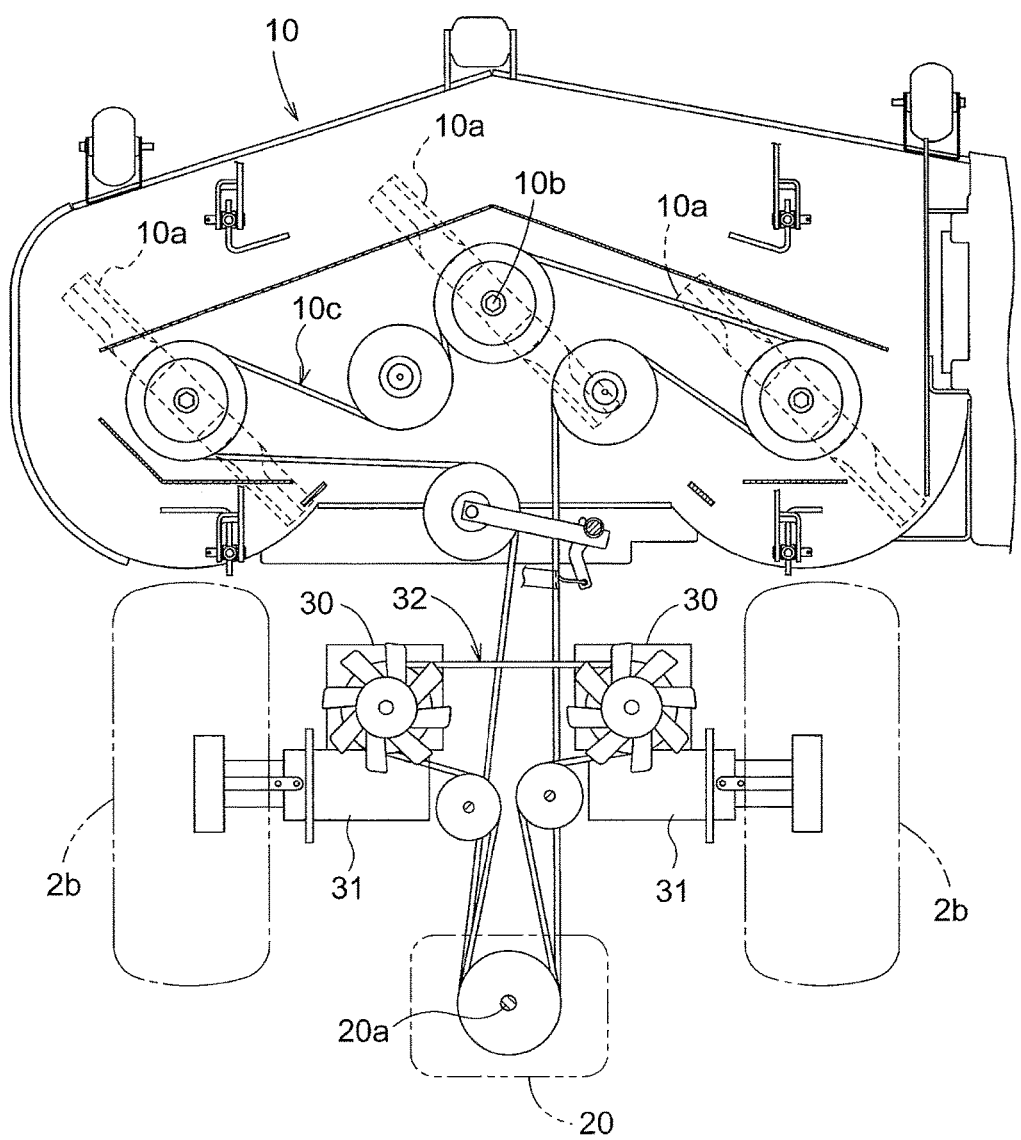
FIG. 2 is a power system diagram of the ZTRM.

As schematically shown in FIG. 2, in correspondence with the respective left and right rear wheels 2b, there are mounted an HST (hydrostatic transmission) 30 and a gear transmission mechanism 31 for transmitting driving power to the rear wheels 2b. The output shaft 20a of the engine 20 and the respective HSTs 30 mount pulleys that constitute a traveling belt transmission mechanism 32 and output of the engine 20 is transmitted to the HST 30.

A speed change ratio of each HST 30 (a range from a forward maximum speed through neutral to a reverse maximum speed) is adjusted based on an operational displacement using the steering lever assembly 6. Namely, the rotational speeds of the left and right rear wheels 2b can be adjusted independently of each other. With this riding grass mowing machine, there are selectively created a neutral state wherein no rotational power is supplied to the left and right rear wheels 2b, a straight traveling state wherein the left and right rear wheels 2b are driven forwardly or reversely at an equal speed, a gentle turning state wherein the left and right rear wheels 2b are driven forwardly or reversely at different speeds from each other, a pivot turning state wherein one of the left and right rear wheels 2b is stopped and the other is driven forwardly or reversely, and a spin turning state wherein one of the left and right rear wheels 2b is driven forwardly and the other is driven reversely.

As shown in FIG. 2, the mower unit 10 includes three blades 10a disposed side by side along a vehicle body transverse direction. Between the output shaft 20a of the engine 20 and a drive shaft 10b of each blade 10a, a mower unit belt transmission mechanism 10c is provided, so that output of the engine 20 is transmitted to the mower unit 10.

Next, with reference to the drawings, the steering lever system according to this embodiment will be explained. This steering lever system, as shown in FIG. 1, comprises a pair of left and right steering lever assemblies 6. Since the arrangements of the respective steering lever assemblies 6 are identical, here, the arrangement of one steering lever assembly 6 will be explained with reference to FIG. 3, FIG. 4, FIG. 5, FIG. 6 and FIG. 7. Though being concealed by a housing 4 attached to the vehicle body 1 in the illustration of FIG. 1, principal constituent components of the steering lever assembly comprise a lever body 60, a pivotal body 7 coupled to this lever body 60, an auxiliary member 82 bolt-fixed to the lever body 60, and a neutral position detector 8 (see FIG. 4).

Figure 3:
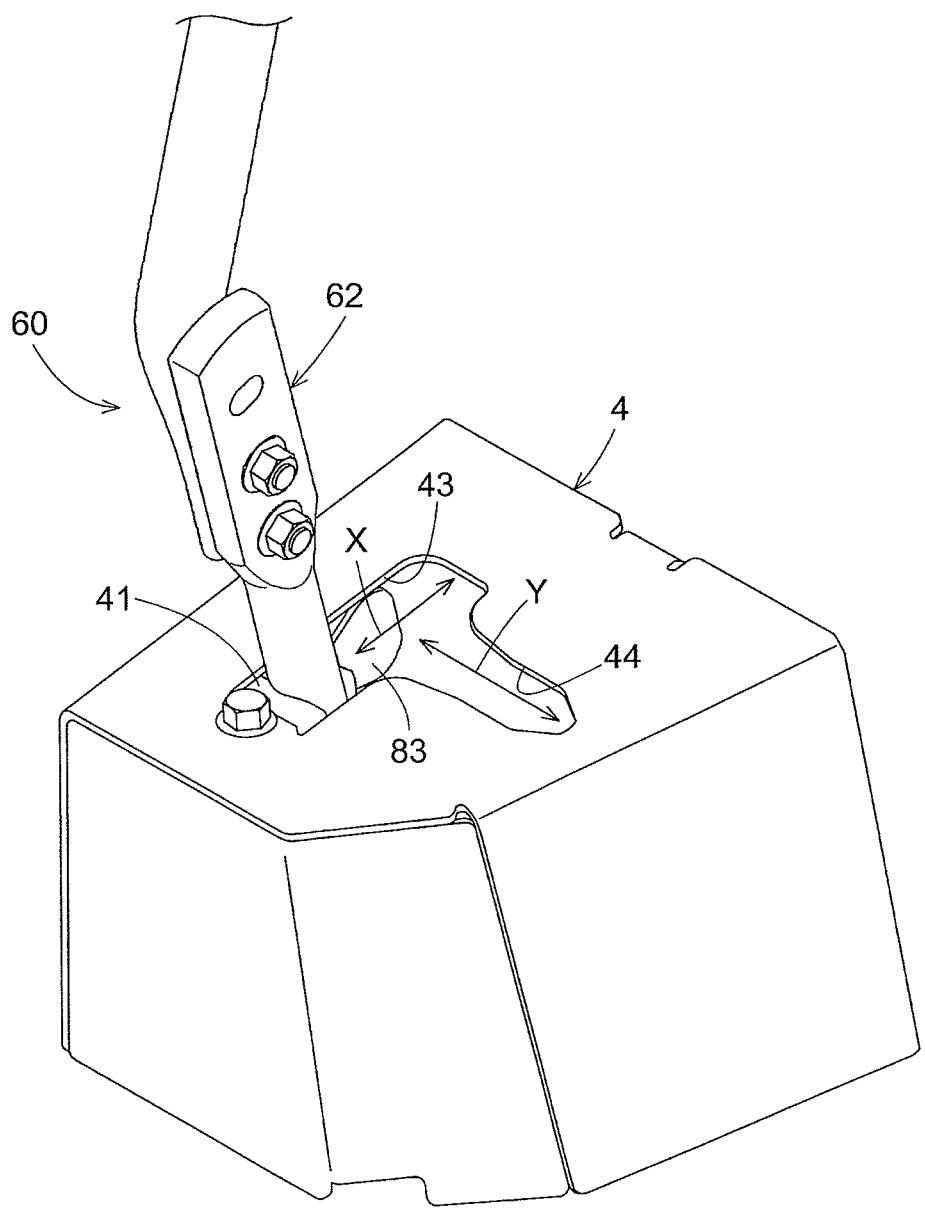
FIG. 3 is a perspective view showing the steering lever system and a guide unit assembled with a vehicle body.

As indicated by arrows in FIG. 3, the lever body 60 is capable of a forward/reverse traveling operational displacement along an X direction from a forward traveling end position through a neutral position to a reverse traveling end position as well as a neutral operational displacement along a Y direction intersecting the X direction from a neutral position to a neutral end position. As may be apparent from FIG. 4, the forward/reverse traveling operational displacement is a pivotal displacement about a second pivot axis P2, whereas the neutral operational displacement is a pivotal displacement about a first pivot axis P1.

Figure 4:
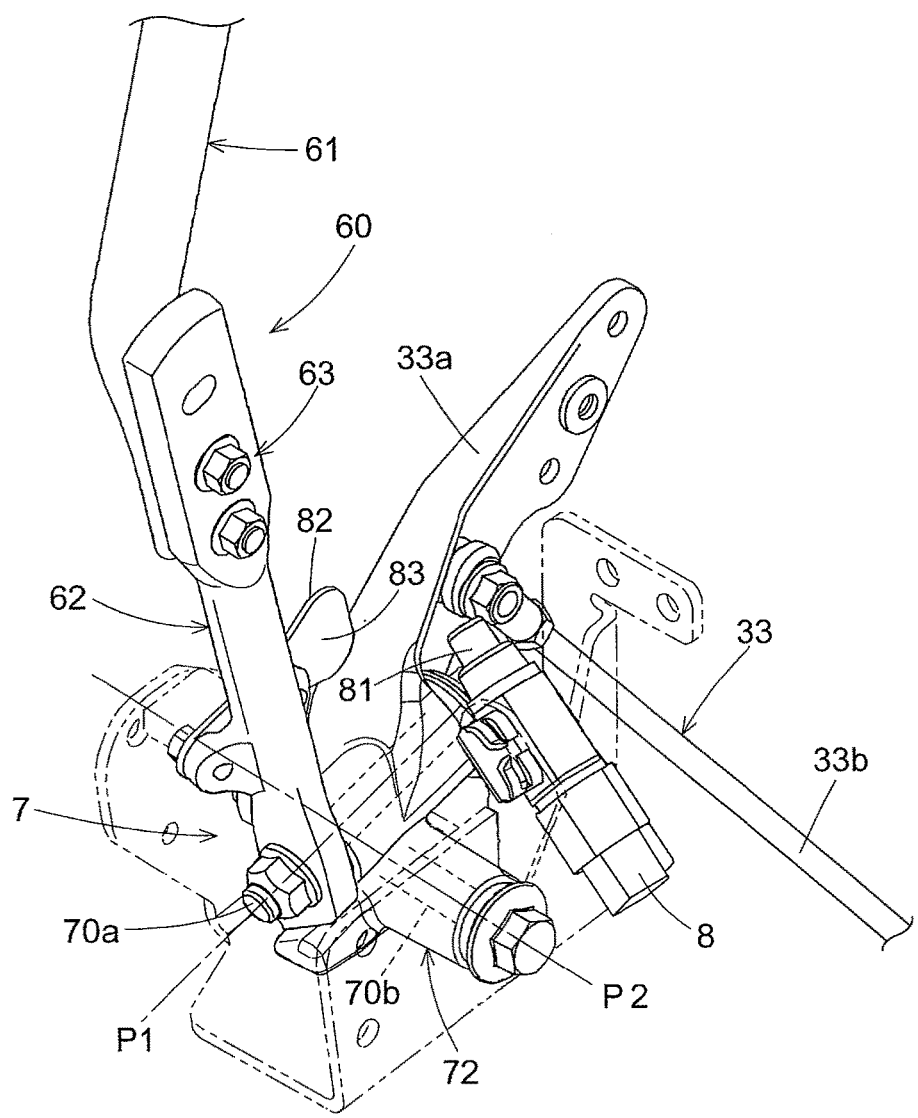
FIG. 4 is a side view showing a lever body at a neutral end position.
Figure 5:
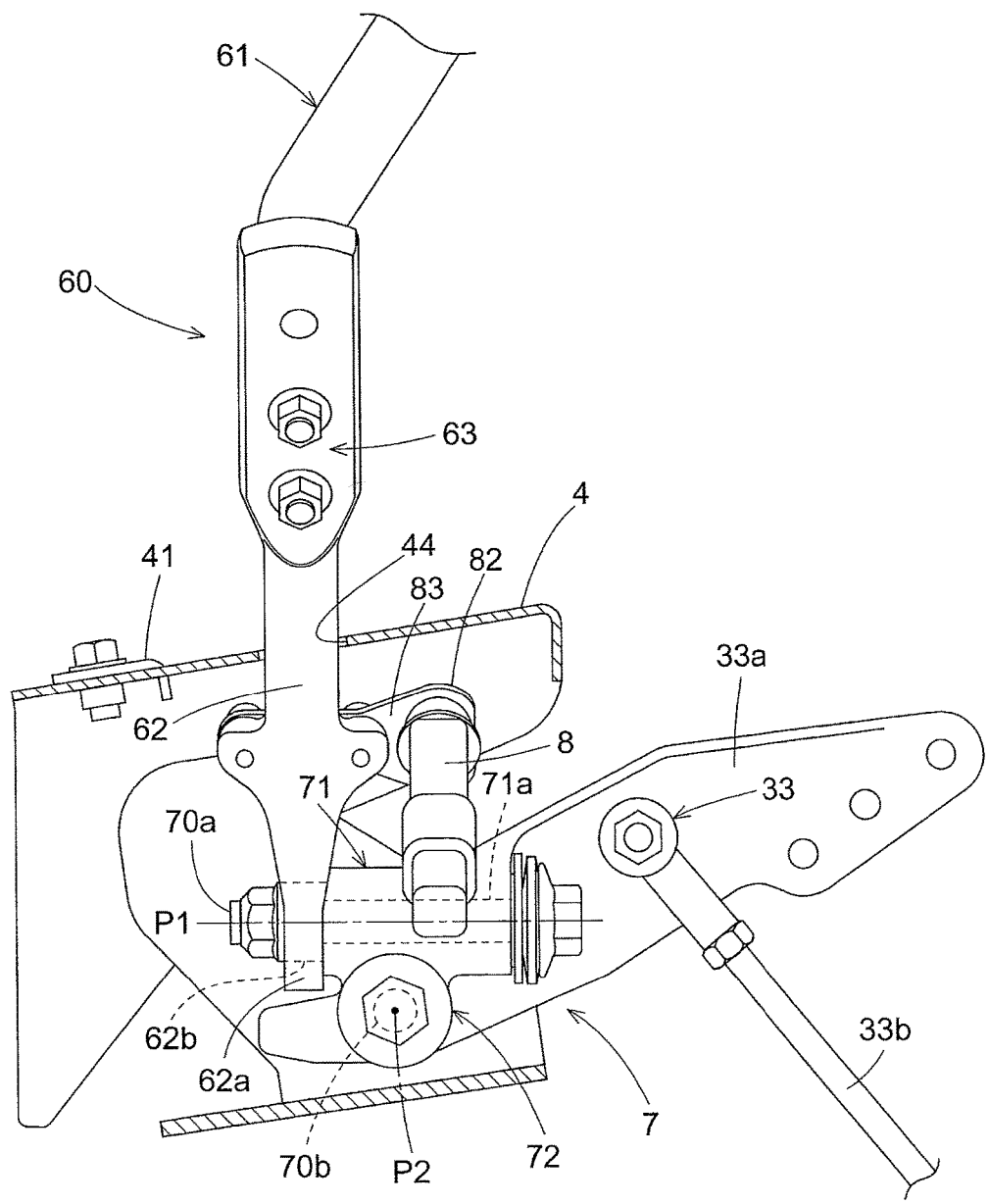
FIG. 5 is a front view showing the lever body at the neutral end position, FIG. 6 a front view showing the lever body at a working neutral position.

As may be apparent from FIG. 1, FIG. 4 and FIG. 5, the lever body 60 consists essentially of a first lever portion 61 and a second lever portion 62 coupled with the first lever portion 61 via a coupling portion 63. The first lever portion 61 is bent in L-shape and consists of a grip portion 61a extending horizontally in the vehicle body transverse direction to be gripped by a driver and a rod portion 61b extending downwards from the grip portion 61a. The second lever portion 62 is a plate-like portion and has its upper end connected to a lower end of the rod portion 61b via the coupling portion 63. The coupling portion 63 comprises bolts and bolt holes. With selection of bolt holes to be bolt-coupled, the length of the lever body 60 can be selected as desired. At a lower portion of the second lever 62, there is defined a lever boss portion 62a having a horizontally oriented boss hole 62b. With use of this lever boss portion 62a, the second lever 62 is coupled to the pivotal body 7 configured to provide the first pivot axis P1 and the second pivot axis P2.

Figure 6:
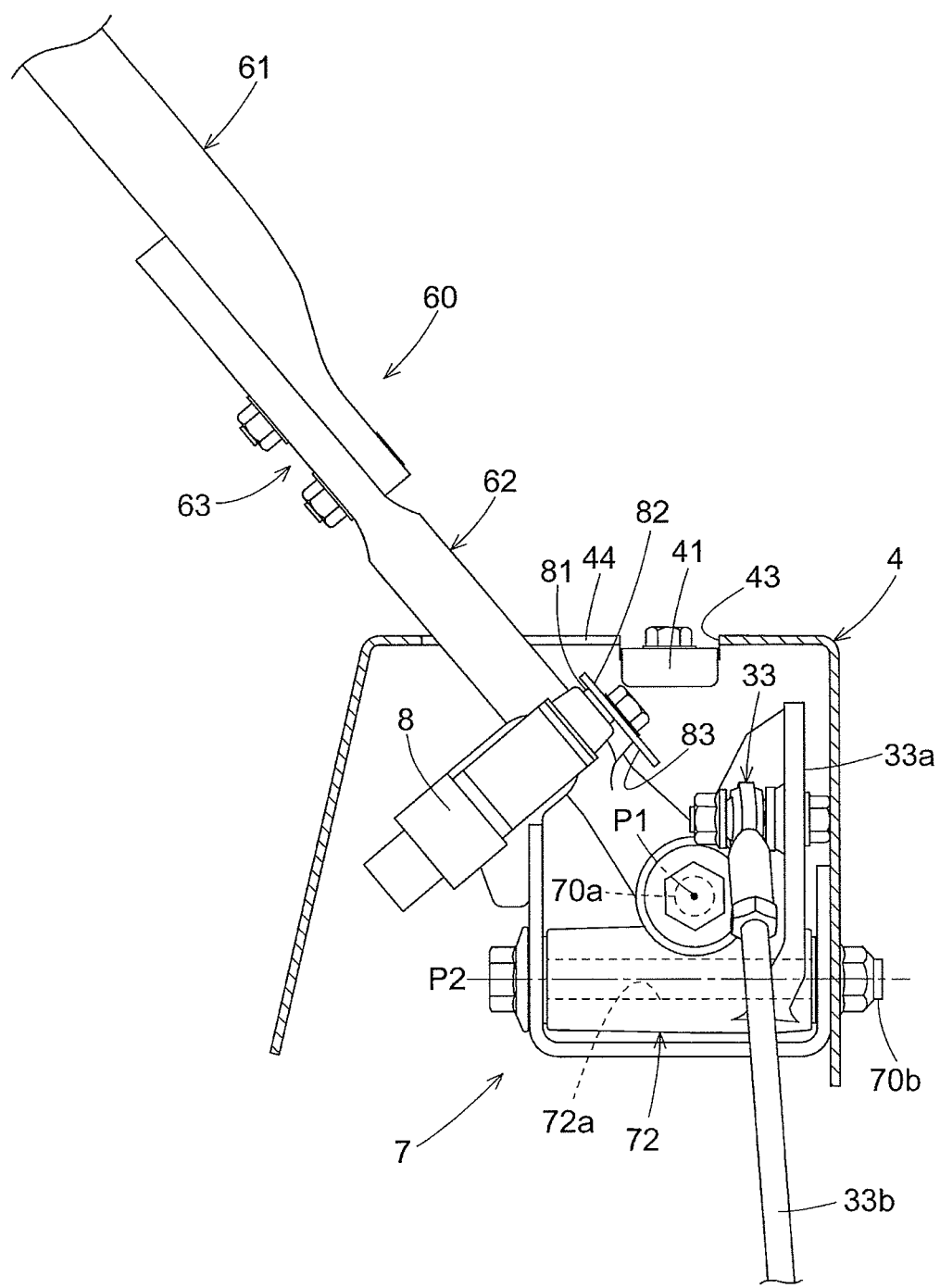
Figure 7:
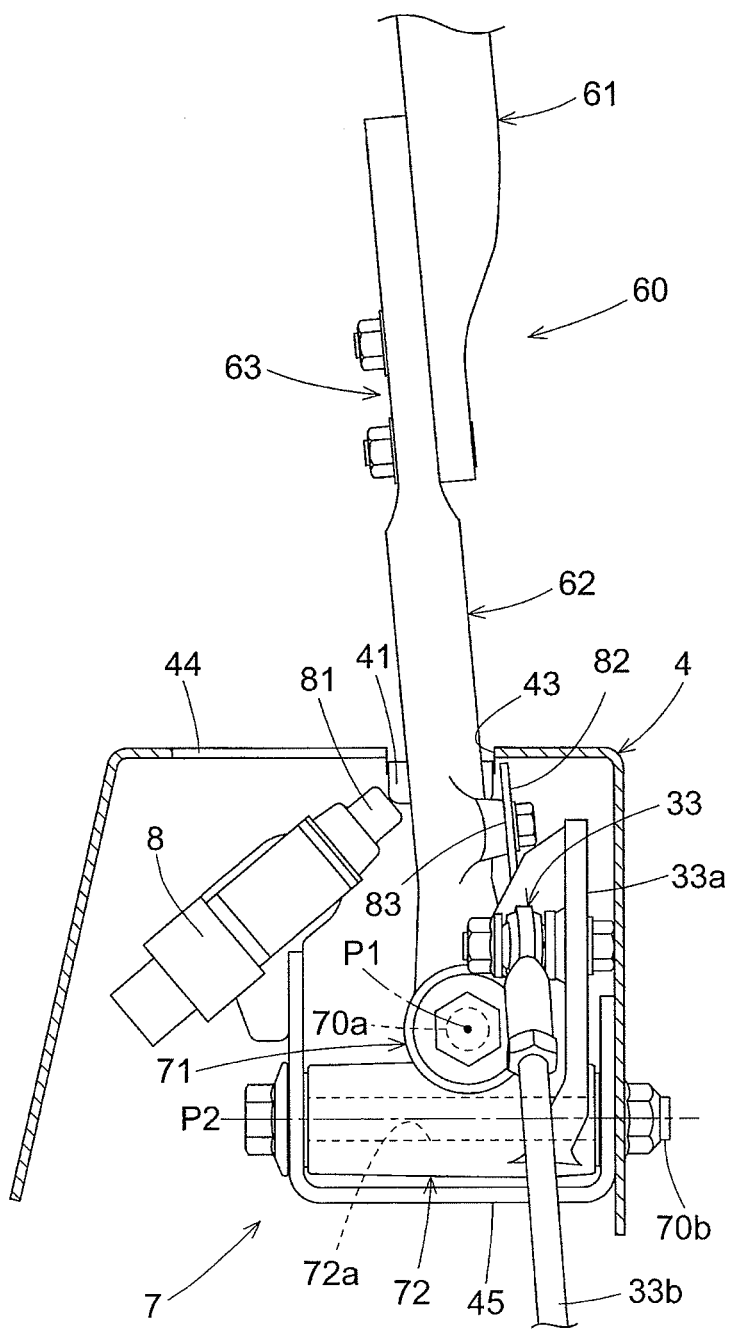
FIG. 7 is a section view of a detent mechanism provided between a lever boss portion and a first boss portion.

As may be apparent from FIG. 4, FIG. 5 and FIG. 6, the pivotal body 7 consists essentially of a first boss portion 71 and a second boss portion 72 which are formed integral with each other. The first boss portion 71 defines a boss hole 71a having an axis in agreement with the first pivot axis P1, and the second boss portion 72 defines a boss hole 72a having an axis in agreement with the second pivot axis P2. In this embodiment, the first pivot axis P1 is located upwardly of the second pivot axis P2, and the first pivot axis P1 and the second pivot axis P2 intersect each other at an angle of 90 degrees approximately. One end of the first boss portion 71 is formed tubular and fitted into the boss hole 62b of the lever boss portion 62a. Further, a bolt-like coupling shaft 70a is inserted into the boss hole 62b of the second lever 62 and the boss hole 71a of the first boss portion 71 and then fastened with using a nut, whereby the pivotal body 7 is coupled to the second lever 62 to be pivotable relative thereto. Incidentally, this coupling shaft 70a acts as a pivot shaft when the lever body 60 is pivoted about the first pivot axis P1. Namely, the first pivot axis P1 is a common axis shared by the boss hole 71a, the boss hole 62b and the coupling shaft 70a. The pivotal movement of the lever body 60 about this first pivot axis P1 creates a neutral operational displacement (Y-direction displacement) in a range from the neutral position to a neutral end position of the lever body 60.

In the boss hole 72a of the second boss portion 72, a support shaft 70b is inserted. The boss hole 72a and the support shaft 70b share an axis which is in agreement with the second pivot axis P2. Though not shown in details, the support shaft 70b is attached to the housing 4 via a bracket 45. This support shaft 70b acts as a pivotal shaft when the lever body 60 is pivoted about the second pivot axis P2. The pivotal movement of the lever body 60 about this second pivot axis P2 creates a forward/reverse traveling operational displacement (X-direction displacement) in a range from a forward traveling end position via a neutral position to a reverse traveling end position of the lever body 60.

The pivotal body 7, more particularly, the second boss portion 72, is pivoted by the forward/reverse traveling displacement of the second lever 62. As shown in FIG. 4 and FIG. 5, for transmitting this pivotal displacement to a speed changer lever (not shown) of an HST 32, there is provided a speed changing operational link mechanism 33. This speed changing operational link mechanism 33 consists essentially of a link lever 33a extending in a form of a wing from the outer circumferential face of the second boss portion 72, and a link rod 33b which couples the link lever 33a with a speed changing operational lever of the HST 32.

A neutral positon detector 8 is provided for detecting arrival of the lever body 60 at the neutral end position which is the terminal end of the neutral operational displacement. In the instant embodiment, this neutral position detector 8 is provided as a water-proof plunger limit switch and is attached to the housing 4 via an unillustrated bracket. The auxiliary member 82 configured to push in a plunger 81 as an operational portion of the neutral position detector 8 is attached to an upper position of the lever boss portion 62a of the second lever 62. In the instant embodiment, the auxiliary member 82 is provided as a plate-like member which projects approximately horizontally in the X direction (direction of the forward/reverse traveling operational displacement) from the second lever 62 and supported cantilever-wise to this second lever 62. In the surface of a slightly widened free end region of the auxiliary member 82, there is formed a detected portion 83. As shown in FIG. 6, at the time of pivotal displacement of the lever body 60 toward the neutral end position, this detected portion 83 comes into abutment against the plunger 81 of the neutral position detector 8.

With the above-described arrangements of the neutral position detector 8 and the auxiliary member 82, the pivotal locus of the second lever 62 about the first pivot axis P1 and the pivotal locus of the detected portion 83 of the auxiliary member 82 are offset in the lateral direction as can be readily understood from FIG. 5 illustration. As a result, even when the plunger 81, that is, the neutral position detector 8, is disposed at an appropriate position not interfering with other components or cables, etc., with selection of the auxiliary member 82 having an offset amount corresponding thereto, it is possible to cause the detected portion 83 to come into abutment against the plunger 81 in the neutral operational displacement of the lever body 60. Upon arrival of the lever body 60 at the neutral end position, the detected portion 83 of the auxiliary member 82 pushes in the plunger 81, so that the neutral position detector 8 outputs a neutral end position detection signal.

As shown in FIG. 4, FIG. 5, FIG. 6 and FIG. 7, in the instant embodiment, the first boss portion 71 has a tubular shape and to the lower face of its center, the center upper face of the second boss portion 72 having a similar tubular shape is connected. The substantive shape of the pivotal body 7 is a simple one comprised of two tubular bodies (the first boss portion 71 and the second boss portion 72) overlapped in a cruciform arrangement. The auxiliary member 82 extends upwardly of the first boss portion 71 and parallel therewith and also parallel in a spaced relationship relative to this first boss portion 71. With this arrangement, in the course of pivotal movement of the lever body 60 from a working neutral positon (see FIG. 7) to the neutral end position (see FIG. 6), the auxiliary member 82 passes over the first boss portion 71 with a spacing relative to this first boss portion 71. With appropriate selection of the spacing between the first boss portion 71 and the auxiliary member 82, it is possible to dispose neutral position detectors 8 of various sizes under various postures.

The housing 4 which is represented by dot lines in FIG. 4 includes a front wall, a rear wall, two side walls and a ceiling wall. In its inside space, the lever boss portion 62a of the second lever 62, the pivotal body 7 and the neutral position detector 8 are accommodated. In the ceiling wall and one side wall of the housing 4, there are formed openings 4a that allow the pivotal displacements of the second lever 62 in the X direction and Y direction.

The housing 4 includes a guide unit 40 upwardly of the opening 4a. The guide unit 40 includes a forward traveling maximum speed position determining plate 41 and a lever guide plate 42. The forward traveling maximum speed position determining plate 41 and the lever guide plate 42 are bolt-fixed to the ceiling wall of the housing 4. The forward traveling maximum speed position determining plate 41 determines a forward traveling maximum speed position of the lever body 60. The lever guide plate 42 includes a guide groove 43 extending in the X direction for guiding the forward/reverse traveling operational displacement of the lever body 60 and a further guide groove 44 extending in the Y direction for guiding the neutral operational displacement of the lever body 60 from the working neutral position to the neutral end position. If desired, the lever guide plate 42 can be formed integrally with the guide unit 40.

[Other Embodiments]

(1) In the foregoing embodiment, the auxiliary member 82 is provided as a plate-like member. Instead, this can be provided as a bar-like member, an irregular-shaped structure. Further, the detected portion 83 can have any shape that ensures smooth response to the neutral position detector.

(2) In the foregoing embodiment, the neutral position detector 8 is provided as a plunger type limit switch. Instead, this can be a lever type or roller type limit switch. Further, the neutral position detector 8 can be provided also as a magnetic proximity switch or an electrostatic capacitance switch. In such case, there will be employed a detected portion 83 of a type deemed suitable for the neutral position detector 8 of chosen type.

(3) In the foregoing embodiment, an HST is used as a variable traveling power supplying mechanism to be operated by the steering lever assembly 6. Instead, any stepless speed changer device such as a belt stepless speed changer device can be employed.

(4) In the foregoing embodiment, the invention is applied to a mid-mount type grass mowing machine, more particularly, a a zero turning radius mower. Instead, the invention is applicable also to a front mower type mower or any work vehicle other than a mower.

The invention claimed is:

1. A steering lever system for controlling forward traveling and reverse traveling of a work vehicle, the system comprising:
 a pair of lever bodies;
 a pivotal body coupled to each of the lever bodies, the pivotal body including a second boss portion and a first boss portion, wherein the lever body is pivotable about a first pivot axis of the first boss portion from a neutral position to a neutral end position, and the lever body is also pivotable about a second pivot axis of the second boss portion from a forward traveling end position through a neutral position to a reverse traveling end position, the second pivot axis extending in a direction transverse to the first pivot axis;
 an auxiliary member fixed to the lever body, the auxiliary member forming a detected portion configured to create a pivotal locus that is laterally offset from a pivotal locus of the lever body about the first pivot axis; and
 a neutral position detector responsive to the detected portion at the neutral end position of the lever body, wherein the neutral position detector is actuated in the neutral position through contact with the detected portion and the detected portion is disposed on an opposite side of the lever body from the neutral position detector.

2. The steering lever system of claim 1, wherein a lever boss portion formed at a lower portion of the lever body and the first boss are disposed side by side along the first pivot axis, and the lever body is pivotally coupled with the first boss via the first pivot axis.

3. The steering lever system of claim 2, wherein the auxiliary member, during a pivotal movement of the lever body from the neutral position to the neutral end position, passes over the second boss portion with a spacing relative thereto.

4. The steering lever system of claim 1, wherein a housing is provided for covering the pivotal body, the auxiliary member and the neutral position detector, and the housing defines a guide groove through which the lever body extends.

* * * * *